Oct. 26, 1965  F. C. MURTLAND  3,213,542
NON-MAGNETIC MATERIAL THICKNESS CHECKER
Filed Nov. 6, 1963  2 Sheets-Sheet 1
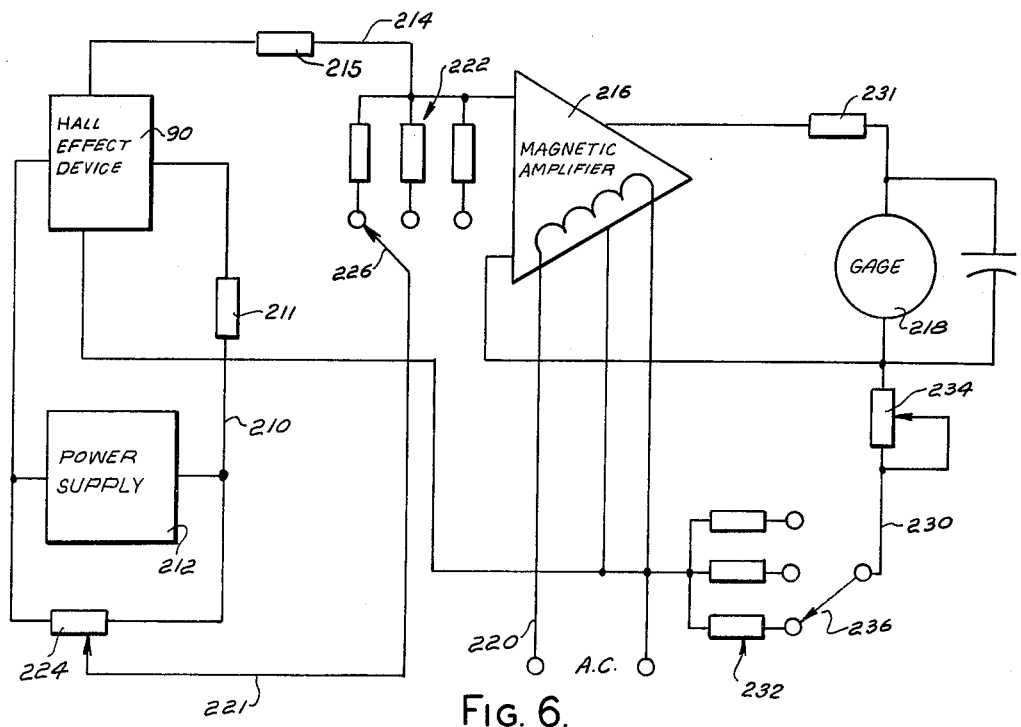
FIG. 6.
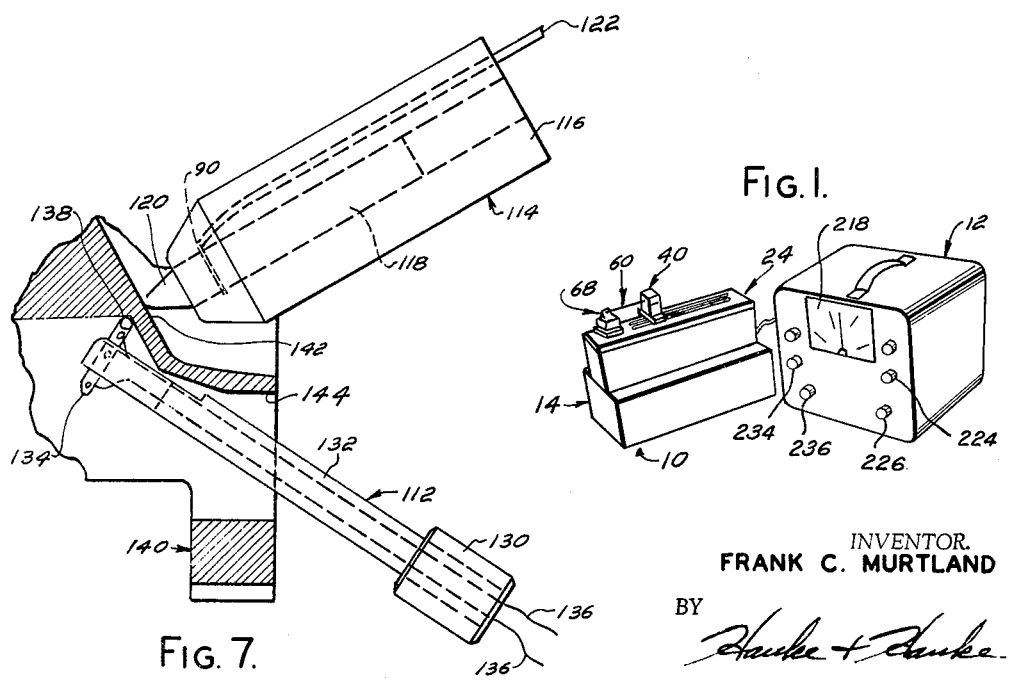
FIG. 1.
FIG. 7.
INVENTOR.
FRANK C. MURTLAND
BY
*Hauke + Hauke*
ATTORNEYS Oct. 26, 1965   F. C. MURTLAND   3,213,542
NON-MAGNETIC MATERIAL THICKNESS CHECKER
Filed Nov. 6, 1963   2 Sheets-Sheet 2

INVENTOR.
FRANK C. MURTLAND
BY
ATTORNEYS

United States Patent Office
3,213,542
Patented Oct. 26, 1965

3,213,542
NON-MAGNETIC MATERIAL THICKNESS
CHECKER
Frank C. Murtland, Farmington, Mich., assignor to Peerless Gage, Inc., Detroit, Mich., a corporation of Michigan
Filed Nov. 6, 1963, Ser. No. 321,921
14 Claims. (Cl. 33—147)

The present invention relates to inspection devices and more particularly to a means for determining the thickness of non-magnetic materials.

It is often necessary to check the thickness of non-magnetic materials in areas where conventional inspection equipment for this purpose cannot be used. An example of such a situation would be where it is necessary to determine the wall thickness at several points along a tubular member constructed of aluminum, brass, plastic or some other non-magnetic material. Conventional inspection instruments for this purpose permit a determination of the wall thickness of the tubular member only in areas relatively near each end of the member.

The present invention provides a non-magnetic material thickness checking device which is constructed to permit its use in areas heretofore impossible to check. The device comprises a head member, a probe member and electrical means for determining and indicating the distance between these members. In one preferred member the head member is mounted in a stationary position on a base and a fixture is adjustably mounted on the base. Interchangeable probe members are carried by the fixture.

In another preferred form the head member and the probe member are separate units and are portable so that the different configurations of materials which can be checked is greatly increased.

It is an object of the present invention to provide means for accurately determining the thickness of various non-magnetic materials by providing a pair of members adapted to be brought into engagement with opposite sides of the material to be checked and electro-magnetic means for determining and indicating the distance between these members.

It is another object of the present invention to provide means for determining the thickness of non-magnetic materials at heretofore inaccessible portions thereof by providing a head member adapted to be positioned in engagement with one side of the material, a fixture adjustably mounted with respect to the head member, probe members interchangeably carried by the fixture so that depending upon the configuration of the material to be checked a selected probe member can be brought into engagement with the side of the material opposite the head member, and means indicating the distance between said members.

It is still another object of the present invention to improve the inspection of non-magnetic workpieces and the like by providing a portable thickness checking device capable of determining dimensions in heretofore inaccessible areas.

Still further objects of the present invention will readily occur to one skilled in the art to which the invention pertains upon reference to the following drawings in which like reference characters refer to like parts throughout the several views and in which FIG. 1 is a perspective view of one preferred checking unit and the indicating unit of the present invention.

FIG. 6 is a schematic illustration of a preferred circuitry arrangement of the present invention, and FIG. 7 is a side elevational view of the present invention and illustrating the unit in use.

Description

Figure 2:
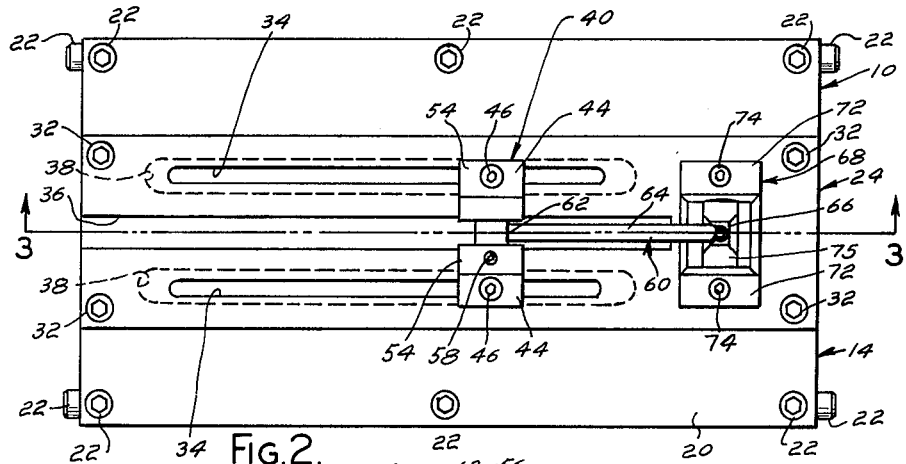
FIG. 2 is a top elevational view of the checking unit illustrated in FIG. 1.

Now referring to the drawings for a more detailed description of the present invention, one preferred checking device is illustrated in FIGS. 1–5 as comprising a checking unit indicated generally by reference character 10 and an indicating unit indicated generally by reference character 12.

Figure 3:
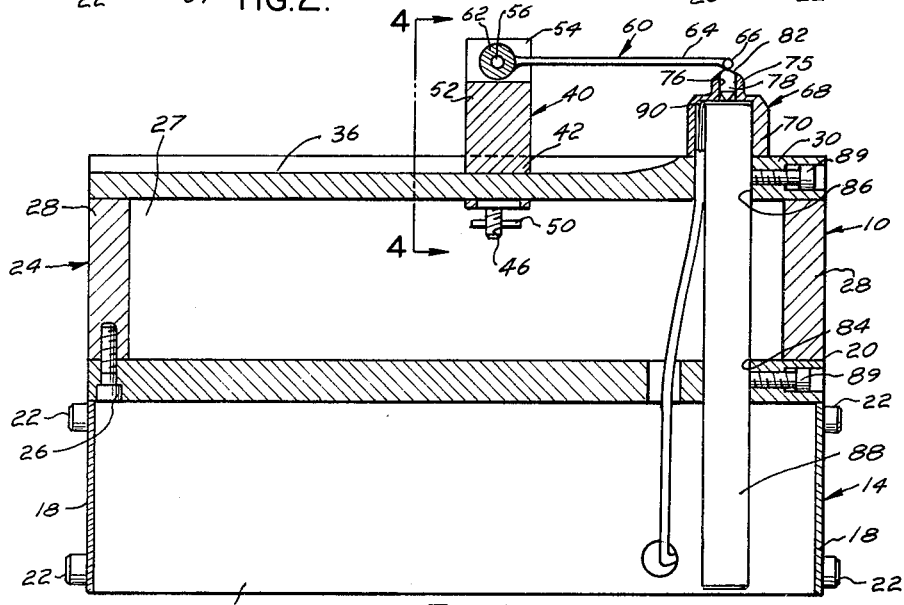
FIG. 3 is a cross sectional view as seen substantially from line 3—3 of FIG. 2.

As can best be seen in FIGS. 1–3, the checking unit 10 preferably comprises a base member 14 constructed of vertically extending side walls 16, vertically extending end plates 18 and a top plate 20. The walls 16 and plates 18 and 20 are secured one to the other by screws 22 to form an open bottom box like structure as shown.

The checking unit 10 further comprises a support member 24 mounted on the upper surface of the top plate 20 as shown preferably by screws 26. The support member 24 comprises vertically extending side walls 27, end plates 28 and a top plate 30 each secured to one another as by screws 32 to form an open bottom box like structure which is positioned on the top plate 20 of the base member 14.

Figure 4:
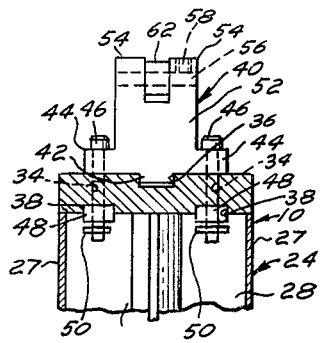
FIG. 4 is a cross sectional view as seen substantially from line 4—4 of FIG. 3.

As can best be seen in FIGS. 2 and 4, the top plate 30 of the support member 24 is preferably provided with a pair of longitudinally extending and parallel slots 34. Positioned intermediate the slots 34 and on the upper surface of the plate 30 a longitudinally extending recess 36 is provided. On the lower surface of the plate 30 and in registry with the slots 34 a pair of parallel longitudinally extending recesses 38 are provided.

The slots 34 and the recesses 36 and 38 provide the means by which a fixture 40 is longitudinally adjustably carried on the support member 24. The fixture 40 preferably comprises a portion 42 adapted to be slidably received in the recess 36 and laterally extending flanged portions 44 which carry bolts 46. The bolts 46 extend through the slots 34 and are received by nut members 48 which engage within the recesses 38 so that upon tightening the bolts 46 the nut members 48 are prevented from rotating and the fixture 40 is securely locked to the support member 24 in the desired longitudinal position. To prevent the nut members 48 and bolts 46 from becoming separated a cross pin 50 may be provided for each of the bolts 46.

The fixture 40 further preferably comprises an upwardly extending yoke portion 52 which forms a pair of spaced arms 54. A pin member 56 is carried between the arms 54 and is locked in position by a set screw 58.

A probe member 60 is provided with a collar 62 pivotally received by the pin member 56. An elongated finger portion 64 extends transversely from the collar 62 and carries at its free end a ball portion 66.

A fitting 68 is longitudinally spaced from one end of the recess 36 and comprises a hollow body member 70 having flanged portions 72 which are secured to the top plate 30 as by screws 74. A raised portion 75 is reduced in section as shown and is provided with a central vertically extending aperture 76. A head member 78 is carried in the aperture 76 and is locked in position by a set screw (not shown).

The head member 78 is preferably formed on a radius on its upper portion 82 and is positioned with respect to the fitting 68 so that the upper portion 72 protrudes therefrom.

As can best be seen in FIG. 3, the top plates 20 and 30 are each provided with perforations 84 and 86 respectively which are aligned with the interior of the fitting 68. A magnet 88 preferably cylindrical in shape as shown extends through the perforations 84 and 86 into the interior of the fitting 68 as shown. The magnet 88 is axially positioned by screws 89. Positioned intermediate the magnet member 88 and the inner end of the head member 78 is a Hall effect semiconductor device 90 the function of which will be described in greater detail below.

The fixture 40 is constructed to permit ready removal of the probe member 60 so that it may be replaced by another probe member similar to the one illustrated but having a finger portion 64 of a greater or lesser length. The particular probe member 60 used will depend upon the configuration of the material being checked and to change the probe member 60 it is only necessary to loosen the set screw 58 and remove the pin member 56. The fixture 40 is adjustable with respect to the support member 24 so that regardless of the length of the finger portion 64 the ball portion 66 can be positioned closely adjacent the head member 78.

Figure 5:
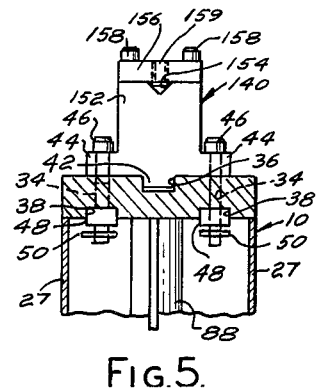
FIG. 5 is a view similar to FIG. 4 but illustrating a modified fixture of the present invention.

It is clear that the fixture 40 can take many different forms and to illustrate this another preferred fixture 140 is illustrated in FIG. 5. The fixture 140 is similar to the one described above except that its upper portion 152 is provided with a V-shaped recess 154. A cap member 156 fits over the recess 154 and is secured to the fixture 140 as by screws 158. In this way the finger portion 64 of probe members 60 having various diameters and lengths can be securely locked in the fixture 140.

It is important as will become clear as the description proceeds that each of the parts comprising the checking unit 10 with the exception of the ball portion 66 of the probe member 60, the head member 78, the Hall effect device 90 and the magnet 88 be constructed of some non-magnetic material such as brass, aluminum, plastic or the like. Both the ball portion 66 and the head member 78 are preferably constructed of some highly magnetic material such as soft iron.

In operation the non-magnetic material to be checked is positioned intermediate the head member 78 and the ball portion 66 of the probe member 60. It is clear that the adjustability features of the checking unit 10 permits materials of various lengths and configurations to be so positioned. The magnetic force produced by the magnet 88 will draw the ball portion 66 of the probe member 60 toward the head member 78 and into tight engagement with the material being checked. Because the ball portion 66 is of a magnetic material it will interfere with the flux pattern of the magnet 88. The amount of interference will depend upon the thickness of the material being checked. The Hall effect device is positioned within the flux path produced by the magnet 88 and as will be described below in effect detects the changes in the flux pattern produced by the ball 66 and produces an electrical impulse which depends upon the amount of interference and thus upon the thickness of the material being checked.

Now referring to FIG. 6 for a preferred circuitry which utilizes the Hall effect device 90, to produce a visible indication of the thickness of the non-magnetic material being checked, a circuitry is shown as comprising a power circuit 210 electrically connecting a power source 212 across the Hall effect device 90. The power source 212 in the preferred embodiment illustrated comprises a source of substantially constant 9 volt D.C. electrical energy. A metered current circuit 214 is also connected across the Hall effect device 90 connecting the device in series to a magnetic amplifier 216 and a suitable dial type gauge 218.

The Hall effect device 90 produces a metered current through the circuit 214 which is directly proportional to the density of the flux through the device 90 as well as the input current produced by the power source 212. By holding the voltage directed to the device 90 by the power source 212 to a constant value, then the current passing through the metered current circuit 214 will be a function of the density of flux passing through the device 90 and thus will be a function of the distance between the ball portion 66 of the probe member 60 and the head member 78. The output current produced by the Hall effect device 90 is amplified in the conventional manner by the magnetic amplifier 216 which is connected across an A.C. circuit 220 as shown. The changes in current after being amplified produces a visible indication on the gauge 218 which may be calibrated to indicate the thickness of the material being checked.

A zeroing circuit 221 is provided so that the gauge 218 can be adjusted to read zero for any desired thickness to be checked. The circuit 221 connects the power source 212 with the input side of the amplifier 216 and comprises a plurality of resistors 222 connected in parallel and a potentiometer 224. A switching means 226 is provided so that one of the resistors 222 of a desired value can be selected. The potentiometer 224 permits the current of the circuit 221 to be finely adjusted so that selected voltage can be introduced into the metered circuit 214 to position the pointer of the gauge 218 on zero for any desired thickness. In practice a set master (not shown) of the desired thickness is positioned intermediate the ball portion 66 of the probe member 60 and the head member 78. With the set master in position the switching means 226 and the potentiometer 224 are adjusted to position the pointer of the gauge 218 on zero.

A spanning circuit 230 connects the gauge 218 with the power source 212. The spanning circuit 230 comprises a plurality of resistors 232 connected in parallel and a potentiometer 234. A switching means 236 permits one of the resistors 232 to be selected and the potentiometer 234 permits the amount of voltage across the gauge 218 to be finely adjusted so that with a proper selection of the resistors 232 and the adjustment afforded by the potentiometer 234 a voltage can be introduced with permits the calibrations provided on the gauge 218 to be used for various thicknesses. Coupling resistors 211, 215 and 231 are preferably provided in the circuits 210, 214 and 230 respectively.

The electrical components of the present invention with the exception of the Hall effect device 90 are preferably carried within the indicating unit 12 illustrated in FIG. 1.

Another preferred checking unit of the present invention is illustrated in FIG. 7 as comprising a portable probe member 112 and a portable head member 114. The head member 114 preferably comprises a non-magnetic handle portion 116 carrying a magnet 118 and a head portion 120. The head portion 120 is preferably constructed of magnetic material and the Hall effect device 90 is carried intermediate the magnet 118 and the head portion 120. The Hall effect device 90 is connected to the indicating unit 12 and the circuitry above described by leads 122.

The probe member 112 preferably comprises a handle portion 130 which carries an extension 132. On the free end of the extension 132 a lever member 134 is pivotally carried. Wire members 136 are connected to the lever member 134 so that the same may be pivoted from the free end of the handle portion 130 by a proper manipulation of the wire members 136. The free end of the lever member 134 is provided with a ball member 138. Each of the parts of the probe member 112 is constructed of a non-magnetic material with the exception of the ball member 138 which as described above is constructed of a highly magnetic material.

The checking unit illustrated in FIG. 7 operates substantially as described above. For purpose of illustration a workpiece 140 is shown in which it is desired to check the thickness of a wall 142 in an area which heretofore used inspection equipment could not be used. The probe member 112 is inserted through the opening 144 in the workpiece 140 and the wire members 136 are manipulated to bring the ball member 138 into contact with one side of the wall 142. The head portion 120 of the head member 114 is brought into engagement with the opposite side of the wall 142. The changes in flux density as sensed by the Hall effect device 90 are then transmitted to the gauge 218 as described above to accurately indicate the thickness of the wall 142.

Although it has been preferred to describe the embodiments of the present invention as including a permanent magnet for producing the required magnetic field, it is apparent that other magnetic field producing means such as a coil member could be used instead.

It is apparent that a non-magnetic thickness checker has been described which is extremely accurate and which is capable of use in checking materials in areas which were heretofore impossible to check. It is also apparent although only several embodiments and modifications of the present invention have been described many changes can be made without departing from the spirit of the invention as expressed by the appended claims.

I claim:

1. A non-magnetic material thickness checking device comprising,
    (a) means adapted to engage opposite sides of the material to be checked,
    (b) said means including a first means engaging one side of said material and operable to produce a magnetic field and a second means of magnetic material engaging the other side of said material whereby to produce a change in the flux pattern produced by said first means which depends upon the distance between said first and second means,
    (c) one of said first and second means being mounted in a fixed position and means mounting the other of said first and second means for movement toward and away from said fixed means in at least two different directions,
    (d) electrical means including means sensing the changes in the flux pattern produced by said second means and means visibly indicating the changes sensed by said sensing means.

2. The device as defined in claim 1 and in which said sensing means includes a Hall effect semi-conductor device disposed within the magnetic field produced by said first means.

3. The device as defined in claim 2 and in which said electrical means includes
    (a) a source of substantially constant power electrically connected across said Hall effect device,
    (b) an output circuit connected across said Hall effect device, and
    (c) said indicating means including a gauge electrically connected to said output circuit.

4. The device as defined in claim 3 and in which said electrical means includes amplifying means connected with said output circuit intermediate said Hall effect device and said gauge.

5. The device as defined in claim 4 and in which said electrical means includes a zeroing circuit electrically connected with said output circuit and selectively operable to vary the voltage received by said amplifying means.

6. The device defined in claim 4 and in which said electrical means includes a spanning circuit electrically connected with said output circuit and selectively operable to vary the voltage received by said gauge.

7. A non-magnetic material thickness checking device comprising
    (a) means adapted to engage opposite sides of the material to be checked,
    (b) said means including a first means engaging one side of said material and operable to produce a magnetic field and a second means of magnetic material engaging the other side of said last mentioned material whereby to produce a change in the flux pattern produced by said first means which depends upon the distance between said first and second means,
    (c) means mounting said first means in a fixed position and means mounting said second means for movement in at least a first direction toward and away from said first means and a second different direction toward and away from said first means,
    (d) electrical means including means sensing the changes in the flux pattern produced by said second means and means visibly indicating the changes sensed by said sensing means.

8. The device as defined in claim 7 and in which said last mentioned mounting means includes means pivotally carrying said second means for pivotal movement toward and away from said first means.

9. The device as defined in claim 7 and in which said mounting means comprises
    (a) a support member carrying said first means and means pivotally securing said second means to said support member for pivotal movement in said first direction toward and away from said first means, and
    (b) means for moving said pivotal securing means with respect to said support member toward and away from said first means in said second direction.

10. A non-magnetic material thickness checking device comprising
    (a) a magnetic field producing member,
    (b) a magnetic head member carried in a fixed position with respect to said first mentioned member and within the magnetic field produced by said first mentioned member and being adapted to engage one side of the material to be checked,
    (c) a Hall effect device positioned intermediate said first mentioned member and said head member,
    (d) an elongated probe member including an end portion constructed of a magnetic material and a first means mounting said probe member for movement about a pivotal axis in a plane intersecting said head member and a second mounting means for moving said pivotal axis toward and away from said head member whereby said end portion can be brought into a position engaging the side of the material opposite said head member to produce an interference with the magnetic field produced by said first mentioned member which depends upon the thickness of the material being checked,
    (e) a power source and an output circuit being connected across said Hall effect device whereby the voltage transmitted through said output circuit will vary with the flux density produced through said Hall effect device, and
    (f) means connected to said output circuit and visibly indicating the changes in voltage therein.

11. The device as defined in claim 10 and including amplifying means connected with said output circuit intermediate said Hall effect device and said indicating means.

12. The device as defined in claim 10 and including a circuit electrically connected with said output circuit and being selectively operable to vary the voltage received by said indicating means.

13. The device as defined in claim 10 and including
(a) a base member,
(b) said head member and said first mentioned member being secured to said base member,
(c) said second mounting means including a fixture adjustably mounted on said base member,
(d) said first mounting means including means removably and pivotally securing said probe member to said fixture.

14. The device as defined in claim 10 and including
(a) a first handle member carrying said head member, said Hall effect device and said first mentioned member, and
(b) a second handle member carrying said probe member.

References Cited by the Examiner

UNITED STATES PATENTS

| | | | |
|---|---|---|---|
| 2,484,623 | 10/49 | Heising | 73—67.7 |
| 2,562,120 | 7/51 | Pearson | 324—45 |
| 2,820,300 | 1/58 | Galomski | 33—147 |
| 2,834,938 | 5/58 | Cunningham | 33—147 |
| 2,863,221 | 12/58 | Toubhans | 33—147 |
| 2,942,177 | 6/60 | Neumann et al. | 324—45 |
| 2,968,100 | 1/61 | Etchell | 33—147 |

FOREIGN PATENTS 1,046,344 12/58 Germany.

ISAAC LISANN, *Primary Examiner.*